Fig. 1

Sept. 22, 1953  J. G. DE REMER  2,652,710
COMBINED WASHING AND CENTRIFUGAL DRYING MACHINE
Filed March 3, 1948  7 Sheets-Sheet 2

INVENTOR.
JAY GRANT DEREMER
BY
Austin, Wilhelm & Carlson
ATTORNEYS.

INVENTOR.
JAY GRANT DEREMER
BY
Austin, Wilhelm & Carlson
ATTORNEYS.

Sept. 22, 1953      J. G. DE REMER      2,652,710
COMBINED WASHING AND CENTRIFUGAL DRYING MACHINE Filed March 3, 1948      7 Sheets-Sheet 5

INVENTOR.
JAY GRANT DeREMER
BY
Austin, Wilhelm & Carlson
ATTORNEYS.

Sept. 22, 1953  J. G. DE REMER  2,652,710
COMBINED WASHING AND CENTRIFUGAL DRYING MACHINE
Filed March 3, 1948  7 Sheets-Sheet 6

INVENTOR.
JAY GRANT DEREMER
BY
Austin, Wilhelm & Carlson
ATTORNEYS.

Sept. 22, 1953          J. G. DE REMER          2,652,710
COMBINED WASHING AND CENTRIFUGAL DRYING MACHINE
Filed March 3, 1948                            7 Sheets-Sheet 7

INVENTOR.
JAY GRANT DeREMER
BY
Austin, Wilhelm & Carlson
ATTORNEYS.

Patented Sept. 22, 1953

2,652,710

UNITED STATES PATENT OFFICE 2,652,710

COMBINED WASHING AND CENTRIFUGAL DRYING MACHINE

Jay Grant De Remer, Darien, Conn., assignor to
J. G. De Remer Research Corporation, Union
City, N. J., a corporation of New Jersey Application March 3, 1948, Serial No. 12,718

6 Claims. (Cl. 68—23)

The invention relates to washing machines and centrifugal extractors and, more particularly, to washing machines in which the laundry is washed and centrifugally dried in a single basket.

The invention includes improvements over devices disclosed in my copending applications Ser. No. 494,598, filed July 14, 1953 (now Patent No. 2,533,722), and Ser. No. 554,327, filed September 15, 1944 (now Patent No. 2,525,781).

Among features of improvement over said copending applications are: an improved gyrostabilizing structure in which an unsymmetrical spring arrangement is provided to facilitate tipping of the basket from central drying position to off-center gyratory washing position; an improved universal joint between upper and lower spin shaft sections to reduce vibration; an improved motor drive and transfer clutch to shift between washing and drying positions; the use of a motor slip clutch to reduce gyrator shaft speed during acceleration of the spin shaft; improved froth and water sealing arrangements to exclude water and froth from the stabilizing friction surfaces and other parts of the drive; an improved non-spilling basket to permit washing in an imperforate type basket without replenishing water during the washing operation; to provide open-type liquid balance rings on the basket, using liquid discharged from the basket to reduce basket wobbling during drying; to combine the gyrostabilizing principle with the liquid balance ring principle in such manner as to improve overall balancing action.

The invention also consists in certain new and original features and combinations hereinafter set forth and claimed.

Although the novel features which are believed to be characteristic of this invention will be particularly pointed out in the claims appended hereto, the invention itself, as to its objects and advantages, and the manner in which it may be carried out, may be better understood by referring to the following description taken in connection with the accompanying drawings forming a part hereof, in which:

In the following description and in the claims, various details will be identified by specific names for convenience, but they are intended to be as generic in their application as the art will permit.

Like reference characters denote like parts in the several figures of the drawings.

In the drawings accompanying and forming part of this specification, certain specific disclosure of the invention is made for purposes of explanation, but it will be understood that the details may be modified in various respects without departure from the broad aspect of the invention.

Figure 1:
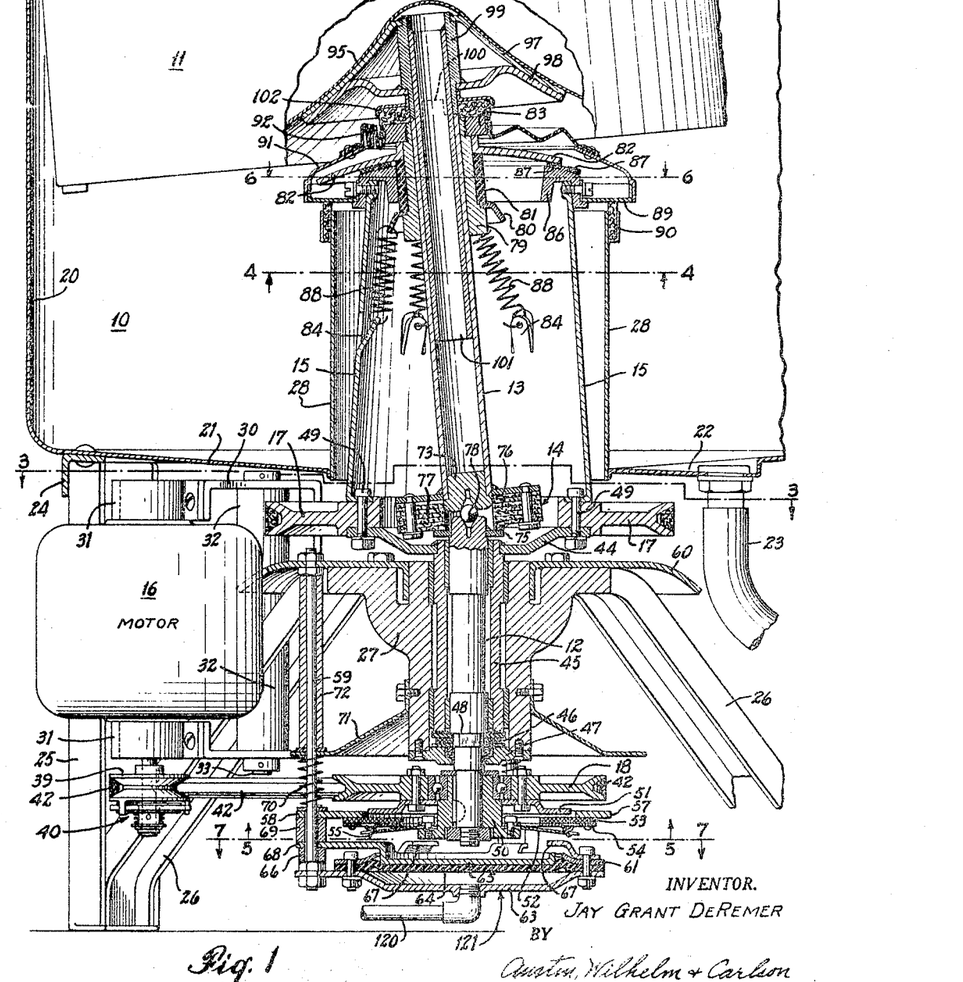
Fig. 1 is a vertical section through the washing machine, showing principally the construction of the gyrostabilizer and the drive mechanism; parts are in washing position.
Figure 2:
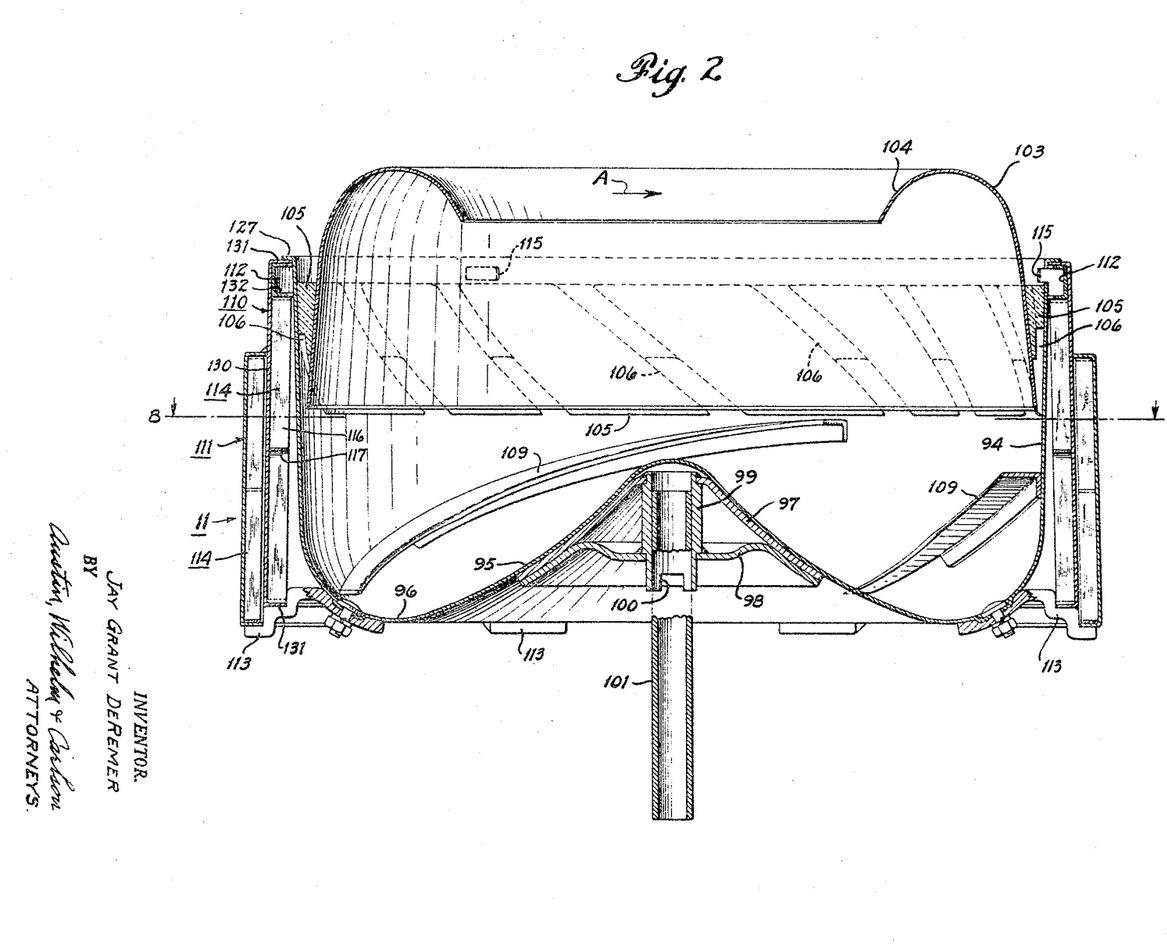
Fig. 2 is a vertical section through the basket, showing also the open, liquid balance rings.
Figure 3:
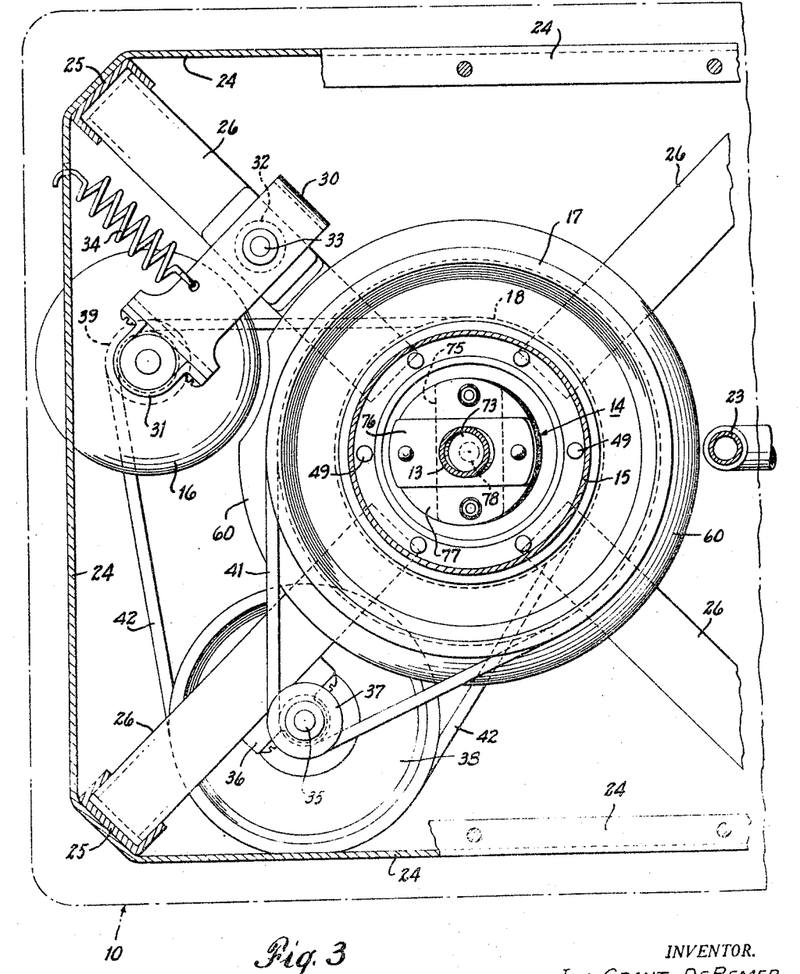
Fig. 3 is a plan section on the line 3—3 of Fig. 1, showing motor and belt drive.

Referring now to the drawings, and more particularly to Figs. 1 to 3, the laundry machine comprises, in general, a tank 10 containing an imperforate type clothes basket 11. The basket is driven for centrifugal extraction by a spin shaft made up of a lower section 12 and an upper section 13 connected by a universal joint 14. The basket is gyrated for washing by a gyrator shaft comprising a lower section 45 and an upper section 15 rigidly connected by a series of bolts 49 which also connect gyrator pulley 17. Electric motor 16 drives the gyrator shaft through pulley 17 and the spin shaft through spin pulley 18. The basket 11 has helical washing blades 100 and filler ring 105 with reversely inclined non-spilling ducts 106. The basket also supports nested, open, water-retaining rings 110 and 111, the former ring having a liquid distributing duct 112, for the purpose of overcoming vibration during the extracting period.

It will be understood that during a washing operation the spin shaft 12, 13 is held stationary, while the gyrator shaft 15, 45 rotates, causing the basket axis to describe the surface of a cone about the vertical axis of the machine, without rotation about its own axis; that is to say, a gyratory motion is imparted to the basket. For centrifugal extraction, the spin shaft is driven, along with the gyrator shaft, causing liquid to be expelled from the clothes. This liquid passes out through the reversely inclined ducts 106; some of the liquid passes through holes 115 into the distributing channel 112 whence it overflows into open rings 110 and 111 as described more in detail below. At the same time, the gyrator shaft, acting through the gyrostabilizing devices, accelerates precession of the spinning basket thereby reducing precession amplitude.

The invention will now be described more in detail.

The tank 10, which may be of metal or other sheet material, has an annular side wall 20, a sloping bottom 21 leading to a sump 22 which is connected to drain pipe 23. Connected at the center of the bottom 21 is a vertical circular cylindrical well 28. The outer wall 20 of the tank may be generally square in plan with rounded corners, as indicated particularly in Fig. 3; while parts of the driving mechanism, including the gyrostabilizer and central concentrical shaft construction, are in general circular in plan.

The tank 10 rests on an annular, substantially square, angle section ring 24; this in turn is supported at its corners by four channel legs 25. A spider, comprising four inclined channel members 26, supports the main central hub 27. The inclined supports 26 may nest inside the legs 25.

Driving mechanism

The motor drive comprises an electric motor 16 supported by a U-shaped bracket 30 having clamps 31 for holding the axial hubs of the motor frame. A pivot tube 32 is fixedly secured to the adjacent spider member 26; and a pivot shaft 33 passes through the pivot tube 32 and motor support 30. A spring 34 (Fig. 3) acts between U-shaped motor support 30 and base ring 24 to urge the motor away from the center of the machine to maintain tension on the drive belts.

The countershaft 35 is journaled on another spider member 26 by a suitably constructed bracket 36. Countershaft 35 supports an upper pulley 37 and a lower pulley 38. Bracket 36 may have suitable spring mounting (not shown) for maintaining tension on the belts.

The drive is taken from motor pulley 39. Pulley 39 is connected to the motor shaft through a spring-acting, constant torque slip clutch, indicated in general by 40. This clutch, as its name implies, is for the purpose of limiting the torque on the motor; the clutch slips when sudden loads are placed on the motor. This clutch has other advantages discussed below.

The idle shaft 35 is driven by a three pulley belt 42, passing over motor pulley 39, idle pulley 38 and spin pulley 18. The gyrator shaft 15, 45 is driven by belt 41 passing over countershaft pulley 37 and gyrator pulley 17. The gyrator shaft is driven continuously by gyrator pulley 17 fixedly mounted thereon; the spin shaft 12, 13 is driven, selectively, by spin pulley 18, depending upon the position of servomotor 121, as described below.

The concentric shaft assembly of inner spin shaft 12, 13 and outer gyrator shaft 15, 45 is journaled in hub 27; hub 27 directly journals the lower gyrator shaft section 45; shaft 45 in turn journals the lower spin shaft section 12. A suitable end thrust bearing 46 is disposed between the end of gyrator shaft 45 and the shoulder 48 on the spin shaft on the one hand, and a cap 47 suitably secured to the bottom of hub 27.

The weight of the basket 11 and laundry is transmitted through the spin shaft 12, 13 through shoulder 48 to the end thrust bearing 46. The several radial bearings between the concentric shafts and the axial thrust bearing may be of any desired type. Oilless bearings have proved satisfactory under test.

The gyrator pulley 17 is mounted on a plate 44 suitably secured to section 45 and bolted to the pulley 17 by a series of bolts 49. These bolts also secure the upper gyrator shaft section 15 which is in the form of an enlarged, frustoconical tube.

The spin shaft 12, 13 is driven by spin pulley 18, or is held from rotation by a brake plate 57, forming part of a transfer clutch, depending upon the position of hydraulic servomotor 121. In the position shown in Fig. 1 the spin shaft is being held stationary with the spin pulley 18 running idle; the gyrator pulley 17 is driving the gyrator shaft, causing the basket to execute its gyrating movement for washing.

Transfer clutch and servomotor

The transfer clutch and servomotor will now be described. A hub 50 is keyed and bolted to spin shaft section 12. Spin pulley 18 rotates freely on hub 50 through a ball bearing. Spin pulley 18 carries clutch plate 51 selectively engageable with the lining 53 on lining plate 54. Bolted to hub 50 is a spring backer plate 52. This plate supports the lining plate 54 which in turn has brake lining 53 riveted thereto.

Figure 5:
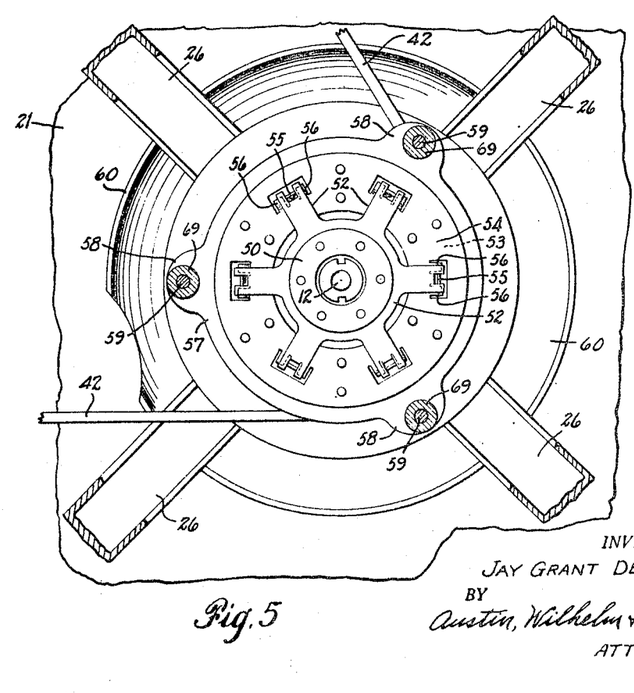
Fig. 5 is a section on the line 5—5 of Fig. 1, illustrating the cooperation of certain clutch plates for shifting between washing and drying operations.

The construction of clutch plates 52 and 54 will be better understood with reference to Fig. 5. The lower or spring backer plate 52 has a series of radial spring arms having slots in the ends thereof. Upper or lining plate 54 has a series of inclined tongues 55 disposed in the aforementioned slots and a series of lugs 56 bearing against the arms of the lower plate 52. This arm and tongue construction both centers upper plate 54 on spring backer plate 52 and non-rotatably connects the plates together.

Brake plate 57 (Fig. 5) has three lugs 58 through which pass rods 59; rods 59 are secured to cover plate 60 which is secured to hub 27. A series of helical springs 70 act between the lugs 58 and a cover 71 secured to the hub 27. Sleeves 72 help take the thrust of the coil springs. These coil springs 70 urge brake plate 57 downwardly against the spring pressed clutch lining 53 to hold the spin shaft 12, 13 stationary and to disengage drive clutch plate 51 on spin pulley 18.

Figure 7:
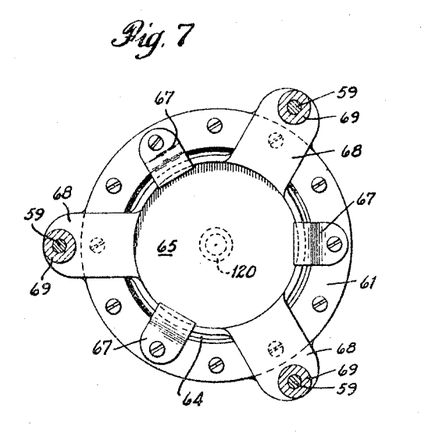
Fig. 7 is a section on the line 7—7 of Fig. 1, illustrating details of the liquid-operated servomotor operating mechanism for shifting between washing and drying positions.

The servomotor 121 comprises a dished backing plate 63 bolted to the ends of rods 59 by suitable nuts. A flexible diaphragm 64 carries a dished actuator plate 65 having fingers 68 slidable on rods 59 (see also Fig. 7). The flexible diaphragm 64 is suitably secured to the backing plate 63 around its periphery by a series of bolts passing through a clamp ring 61. The lower position of the actuator plate 65 is determined by engagement of fingers 68 with spacing washers 66 on the rods 59. The upper position of the actuator plate 65 is determined by engagement of the plate edge with a series of lugs 67 secured to the clamp ring 61.

Upward movement of actuator plate fingers 68 presses the brake plate 57 upwardly, through a series of spacers 69 slidable on rods 59, against the pressure of helical springs 70. The upward movement of brake plate 57 causes lining 53 to engage spin pulley plate 51; further upward movement of brake plate 57 frees lining 53.

Thus it will be seen that, when there is no pressure within the servomotor 121, the parts take the position shown in Fig. 1. Engagement of brake plate 57 with lining 53 holds the spin shaft 12, 13 stationary. This is the washing position. When hydraulic pressure is applied to pipe 120, flexible diaphragm 64 expands, pushing actuator plate 65 upwardly; this causes the engagement of lining 53 and pulley plate 51 and the disengagement of lining 53 and brake plate 57 as above described. This is the centrifugal drying position.

Gyrostabilizer

The universal joint 14 connecting the upper and lower spin shaft sections will now be described; attention is called particularly to Figs. 1 and 3.

The lower spin shaft section 12 carries a cross piece 75 which may be suitably welded thereto. The upper tubular section 13 carries a cross piece 76 which may be suitably welded thereto. These cross pieces are disposed at right angles in plan. A thick neoprene rubber disc 77 is bolted to the cross pieces by bolts as indicated.

To fix the point of flexure between the upper and lower sections of the spin shaft, a ball 78 is provided. This ball is seated in conical recesses, one in solid shaft 12 and the other in an insert plug 73 in tubular shaft 13. Thus the universal joint permits free angular movement of the axis of the upper section 13 with respect to the axis of the lower section 12, while transmitting torque. The ball 78 seated in the above-mentioned conical recesses fixes the point of intersection of the axes of the two shaft sections, regardless of any lateral flexibility of disc 77 which would otherwise permit the above-mentioned point of intersection to shift under the forces developed during centrifugal drying.

The friction plates and associate construction of the gyrostabilizer will now be described.

Figure 4:
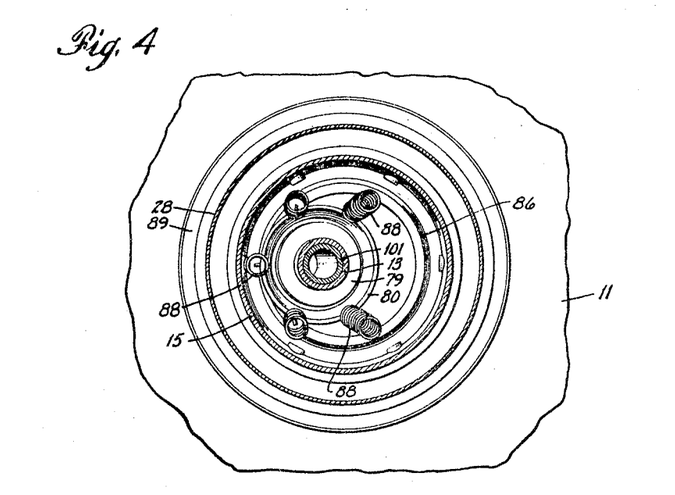
Fig. 4 is a section on the line 4—4 of Fig. 1, illustrating particularly the unsymmetrical centering spring arrangement.

Referring particularly to Figs. 1 and 4, a sleeve 79 is journaled on the upper end of upper spin shaft 13. Sleeve 79 carries a conical anchor plate 80; it also carries a bumper roll 81 which may be of rubber or some other material softer than metal. The sleeve 79 also carries the relatively flat spherical friction plate 82. A nut 83 screwed on sleeve 79 holds all of these parts together.

The upper end of the gyrator shaft section 15 has bolted thereto a ring or friction head 86. Ring 86 has riveted thereto a flat ring 87 which may be of suitable brake lining friction material. The upper surface of friction ring 87 is spherical to cooperate with the spherical lower surface of friction plate 82; the center of the sphere is the center of universal joint ball 78. Upper friction plate 82 preferably is slightly loose on sleeve 79, to take care of any slight inaccuracy in manufacture, which might otherwise prevent the center of its lower spherical surface from coinciding with the center of universal joint ball 78.

Friction head 86 has a conical inner surface conforming to the generally cylindrical surface on bumper roll 81 when these parts are engaged. Friction head 86 has an abutment 85 (Fig. 6) engageable against the bumper roll 81 to assist in driving the basket to impart gyrating movement to the basket during washing, as explained hereinafter.

The spherical friction stabilizing surfaces are urged together by a series of helical tension springs 88. These springs act between anchor ring 80 and lugs 84, struck out of the upper gyrator section 15. These springs, when the spin shaft section 13 is vertical or approximately vertical, act both axially and radially of the spin section 13. They pull the friction surfaces of spherical members 82, 87 together thus making the friction acting between these members independent of the weight of the basket and its contents. They also apply a force tending to center the upper section of the spin shaft with respect to the gyrator shaft.

It will be noted, particularly from Fig. 4, that only five springs 88 are provided. These springs are spaced apart at angles of 60°, corresponding to six springs; the spring at one position is deliberately omitted. This omission is made to give the basket a slight bias in one direction (opposite the missing spring) so as to facilitate tipping of the basket (after a centrifugal drying operation when the basket axis is substantially vertical) to its maximum inclined position, as shown in Fig. 1, for the gyratory washing operation.

The slight unsymmetrical action due to the omission of one spring overcomes any tendency of the basket to remain in central position when the spin shaft has come to rest. With this slight off-center bias, the slight centrifugal force, applied to the basket by the gyration thereof, with the basket substantially upright at the end of a drying operation, causes the basket to swing out all the way to its maximum inclined position with bumper 81 against the friction head 86, as shown in Fig. 1. The soft bumper roll 81 absorbs any slight shock which might otherwise occur.

The omission of the one spring causes the centering point (that is to say, the point to which the spring assembly, acting alone, tends to return the upper spin shaft section), to be located at a point slightly off center from the gyrator shaft axis. This point may be located about one-third the distance between the axis of the gyrator shaft and the angle of maximum inclination of the upper spin shaft section. This slightly off-center "centering" point is in contrast to a centering point exactly on the gyrator shaft axis which would be the condition with a true symmetrical spring arrangement.

Provision is made to prevent water and froth due to saponification of the soap from getting onto the friction surfaces and down into the driving mechanism. To this end a sealing ring 89 is connected to the friction head 86. This ring has a plane lower surface which bears against a felt ring 90 suitably secured to the stationary well 28. Sealing ring 89 carries a canopy 91 which is connected to a flexible bellows-like boot 92 which is clamped to nut 83 by a suitable band. A felt washer 102 secured to the basket 11 also helps seal the central pedestal assembly as discussed below.

Basket and open balance rings

The basket 11 will now be described. Referring now also to Figs. 2 and 8 to 12, the basket 11 comprises a body having an upwardly and outwardly flaring side wall 94 with a cone-like hub 95 connected by an annular trough portion 96. The hub is strengthened by reinforcing plates 97 and 98 connected to nipple 99. These reinforcing plates may be suitably welded to the nipple. They may be connected to the basket hub in any suitable way.

The nipple 99 carries a pair of notches 100 in its edge and also carries an internal tube 101. Tube 101 and notches 100 cooperate with the upper spin shaft section 13 which snugly receives tube 101 and has lugs entering the recesses 100 (Fig. 1). This is for the purpose of making the basket easily detachable from the gyrostabilizer assembly merely by lifting out of the machine.

Nipple 99 carries a holder for felt washer 102 which seals the joint formed by the interfitting lugs and recesses 100 and thus prevents liquid from getting down inside of the tubular gyrator shaft section 13 or down in between sleeve 79 and shaft section 13.

Figure 10:
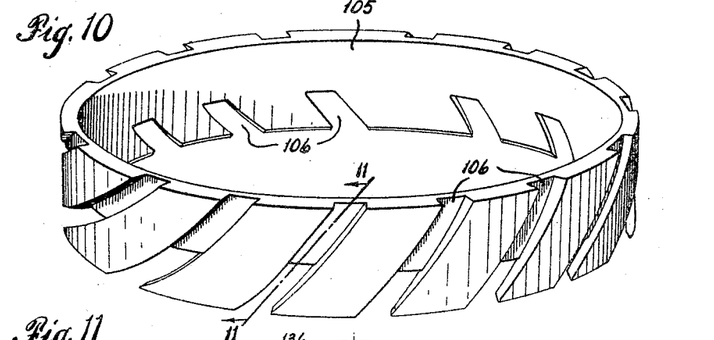
Fig. 10 is a perspective of basket filler ring forming part of the non-spillable basket.
Figure 11:
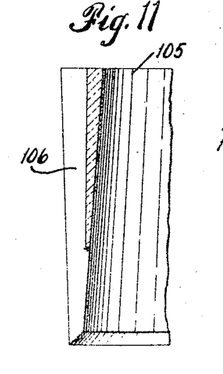
Fig. 11 is a section on the line 11—11 of Fig. 10 illustrating the construction of one of the reversely inclined non-spilling ducts.

The basket body carries a clothes retaining ring 103 made of sheet material and having its top curved inwardly and downwardly to form a trough-like construction 104. The basket ring 103 is connected to the basket body by an anti-spill or filler ring 105 (Fig. 10) which may be made of plastic or other moldable material. As shown in Fig. 10, the ring 105 has a series of helical or reversely inclined grooves 106 in its outer surface which fit against the flaring wall 94 of the basket body. These ducts 106 are reversely inclined to the direction of gyration of the basket indicated by the arrow A in Fig. 2. It will be understood that during washing the basket is gyrated and the water flows in the same direction as the direction of gyration. Thus the water is flowing in such direction with respect to the ducts 106 as to minimize any spilling of the water during washing. At the same time these ducts interpose no resistance to the discharge of water during centrifugal drying.

Figure 8:
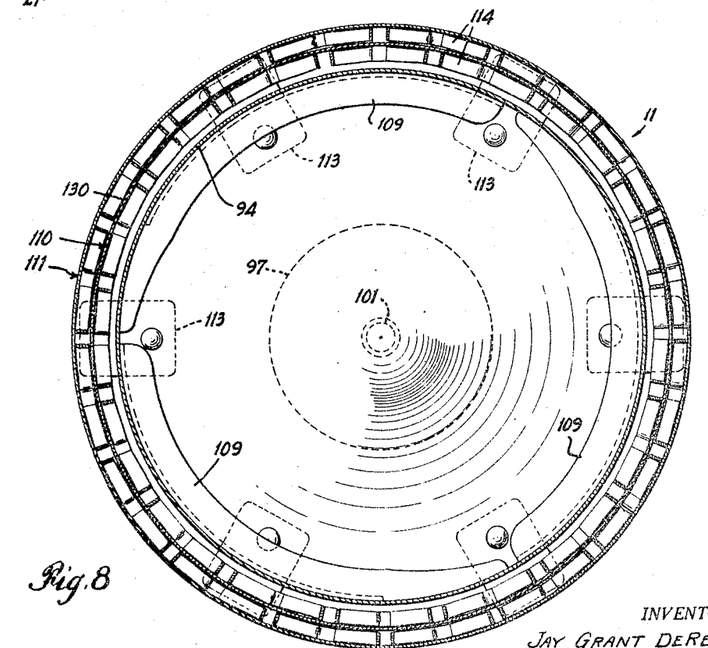
Fig. 8 is a section on the line 8—8 of Fig. 2, taken thru the open, liquid balance rings.
Figure 9:
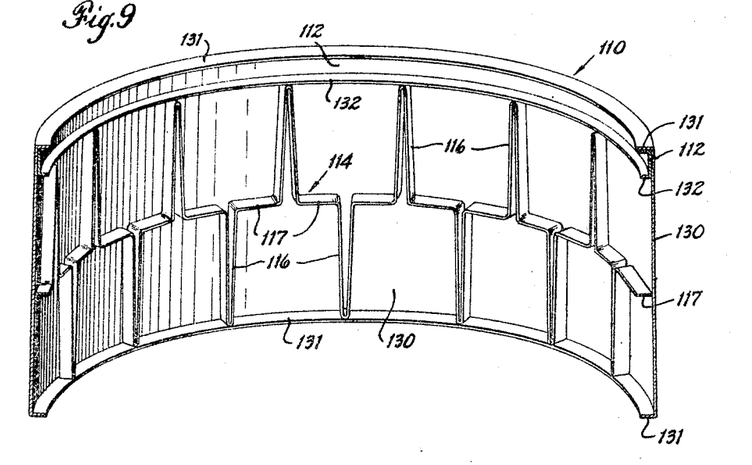
Fig. 9 is a perspective of a section of open balance ring showing distributing channel and baffling.

To assist in the washing action, a series of helical blades 109 are suitably secured to the basket body as indicated particularly in Figs. 2 and 8. As shown, these blades are made of angle section and taper somewhat at their lower ends. These blades help to impart a certain desirable vortex motion to the clothes in the basket, as will be later described. It will be understood that the lower part of this basket is imperforate so as to hold water during the washing operation and that, when once the basket is filled with its charge of water, no further water is added during the washing operation. Thus it is important that the construction be such as to spill a minimum of water from the basket during washing.

Figure 12:
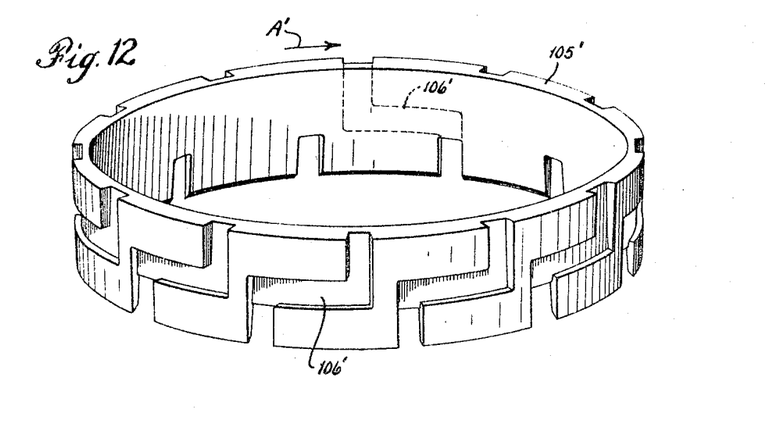
Fig. 12 is a perspective of a modified form of filler ring for the non-spillable basket having ducts of zigzag conformation in contrast to reversely inclined straight conformation.

In place of the filler ring just described, the filler ring shown in Fig. 12 may be used. This filler ring 105' may be very much like the filler ring 105 except that the ducts 106' are made with right angle bends to provide a more tortuous or labyrinth passage. The direction of the bends in the passage 106' bears such relation to the direction of flow of washing liquid during washing (which is in the direction of the arrow A' in Fig. 12), as to minimize loss of water through spillage during washing.

It will be understood that, in either form shown in Fig. 10 or 12, any water, splashing its way part way up through the ducts 106 or 106' during washing, will be returned to the basket by the extension of the outer wall 94 of the basket body above the converging wall 103 of the basket. In this regard, the action of the basket is similar to that described and claimed in my Patent No. 2,372,769, granted April 3, 1945.

For assisting in overcoming vibration during drying, a series of open balance rings are secured to the outside of the basket. These rings comprise, in the form shown, an inner ring 110, an outer ring 111 and a liquid distributing duct 112.

The inner balance ring 110 has a substantially cylindrical, axially extending side wall 130 with radially extending upper and lower walls 131, providing an open internal face. This ring extends in width (axially) throughout substantially the entire vertical extent of the basket. Within this ring is a comparatively narrow duct 112, as shown particularly in Fig. 9. The lower wall 132 of duct 112 is shorter than upper and lower walls 131 on the inner ring to insure liquid, which overflows wall 132, being caught by inner ring 110, as explained below.

Underneath duct 112 is a baffling arrangement 114. This baffling may comprise a flat strip of aluminum or similar metal bent zigzag to form axially extending barriers 116 and a circumferentially extending barrier 117. This baffling is bent up as shown to occupy the entire circumference of the ring and then assembled by placing it in position in the ring before the ring is applied to the basket.

The outer ring 111 has a substantially cylindrical side wall with radial end walls and is substantially identical with the inner ring 110 except that it is of less axial extent. Ring 111 extends below ring 110 so as to receive overflow water therefrom, as described below; it extends short of the top of inner ring 110 to minimize the clearance necessary between the basket and the side wall of the tank. Outer ring 111 has baffling 114 of a similar construction to the baffling 114.

The rings 110, 111 may be assembled, one within the other, before assembly to the basket. They may be welded or otherwise secured together. As shown, the vertical walls of the rings are not true cylinders but are slightly conical to facilitate assembly. They may be smaller at the top, as shown, or they may be smaller at the bottom to conform more closely to the free surface of the rotating liquid contained therein. After the two rings, duct and baffling are assembled together, the ring assembly is applied to the basket and the lower stepped clamps 113 are secured to the basket. These fittings hold the ring assembly against the upper annular flange 127 on the basket wall.

When the rings are mounted on the basket, the distributing duct 112 is disposed adjacent discharge holes 115 in the basket wall, thus feeding centrifugally discharged liquid directly to this duct. To prevent such holes clogging with lint, etc., they are made fairly large; any number of said holes may be provided, but three, equally spaced, as shown, have proven satisfactory in practice.

It is desirable that the baffling 114 fit the rings in such way as not to form individual liquidtight pockets; some leakage or seepage is desirable between pockets so as to permit liquid to flow circumferentially of the ring under the centrifugal extracting operation, as discussed below. In fact, the liquid distributing duct 112 is free of baffles for the purpose of allowing quick flow of liquid circumferentially around the basket. The main purpose of the baffling is to prevent sloshing or surging of the liquid, both in a circumferential direction and in an axial direction.

In some cases the distributing duct 112 may be omitted in which case the baffling in the inner ring will extend the entire axial extent of the ring; in such case the fit of the baffling in the ring may provide sufficient clearance with the vertical wall of the ring to provide the necessary relatively free circumferential flow of liquid in the ring.

Controls

Figure 13:
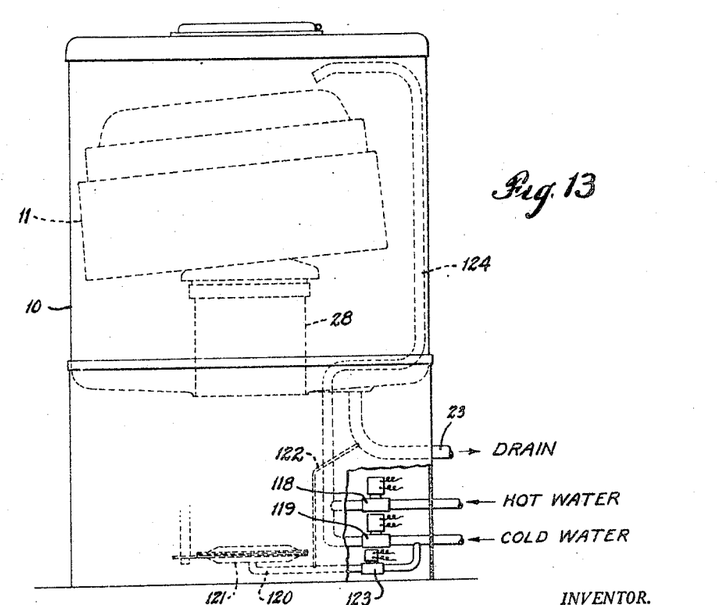
Fig. 13 is a diagram illustrating the main controls for both supplying the machine with hot and cold wash water and for operating the servomotor.

One manner of controlling the machine will now be described. Referring to Fig. 13, hot water and cold water supply pipes are shown, supplying water to feed pipe 124 through solenoid operated valves 118 and 119. Feed pipe 124 supplies water to the open top of the basket 11. The branch pipe 120 connects with servomotor 121, this pipe being controlled by a separate solenoid operated valve 123. Thus when valve 123 is open, servomotor 121 is expanded and the machine is in drying position. When valve 123 is closed, the water leaks out from servomotor 121 through bleeder pipe 122 to drain 23, thus changing the position of the machine to the washing position.

The machine may be controlled either by hand or by a suitable timer (not shown) operating the several solenoid valves at the proper time. A simple complete washing cycle will be given for purposes of illustration.

Water supply valves 118 and 119 will first be operated to fill the basket 11 with a predetermined amount of water at a predetermined temperature. The clothes will be put in the basket and suitable soap or other washing material added. The machine being normally in washing position, the starting of the motor will start the basket gyrating. This gyration will continue for a predetermined time after which the servomotor solenoid 123 will operate to shift the machine to drying position. The basket then spins to extract the liquid from the clothes; the liquid discharges into the tank 10 and flows to drain through pipe 23.

After the clothes are centrifugally dried, solenoid 123 is operated to shift the machine back to washing position; and the solenoid valves 118, 119 will be operated again to supply a predetermined amount of rinse water at the proper temperature. The servomotor solenoid 123 will again be operated to shift the machine to drying position. The basket then spins to centrifugally discharge the rinse water from the clothes. After centrifugal extraction for a predetermined time, servomotor valve 123 is closed and the machine changes back to washing position. A second and similar rinse may be provided. After the final spin the drive motor may be stopped and the centrifugally dried clothes taken from the machine. The machine is now ready for a new batch of dirty clothes.

Comments on washing and drying actions

The washing action is as follows. Assuming the basket 11 has already been tipped over the bumper roll 81 engages friction head 86, and the brake plate 57 is holding the spin shaft 12, 13 stationary; the rotation of the gyrator shaft 15, 45 causes the abutment 85 to push against the roll 81 to impart the gyratory motion to the basket. During this motion the basket axis and upper spin shaft section describe the surface of a cone.

Figure 6:
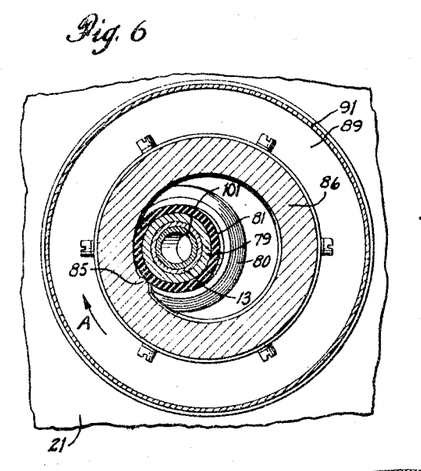
Fig. 6 is a section on the line 6—6 of Fig. 1, illustrating details of the gyrostabilizer.

The speed of gyration is such and the non-spillable construction of the basket is such that the washing action spills a minimum of water from the basket. The gyrating movement is in the direction of the arrow A (Figs. 2 and 6). This is clockwise, looking down on the machine. The gyratory movement of the basket causes the liquid to move in the same direction. Thus, the direction of water movement is opposed to the exit direction of non-spilling ducts 106.

The action of the basket 11 on the clothes, particularly the central hub 97 and the inclined blades, 109, imparts a vortex motion to the clothes. This motion has two distinct major components. Firstly, the clothes move continuously about the basket axis in a direction opposite to the movement of water and to the direction of gyration. Secondly, the clothes move downwardly in the middle of the torous or ring formed by the clothes and upwardly on the outside of the torous or ring. The inertia of the clothes tends to hold them more nearly in a central position while the gyrating basket moves under this mass, batting the clothes to obtain the above-mentioned vortex action.

At the end of the washing period, the machine is shifted to the drying position. This causes the spin shaft to rotate at drying speed while the gyrator shaft continues rotating in the same direction as before. This centrifugal speed causes the water to be discharged from the basket through discharge holes 115 and into the open balance rings as described below.

The direction of spin is the same as the direction of gyration, that is, the spin and gyrator shafts rotate in the same direction. The ratio of gyrator shaft speed to spin shaft speed may vary considerably depending upon design; in the present case the preferred ratio is about one to five, that is, the spin shaft runs about five times as fast as the gyrator shaft.

When the basket and its contents are spinning for centrifugal extraction, they act as the rotor of a gyroscope. Normally, the contents of the basket are not evenly distributed, giving the basket a certain unbalance. Hence, the center of mass of the spinning mass, including the basket, its contents and everything spinning therewith, will not always coincide with the geometric axis of the basket. Therefore, the spinning mass rotates about its true center of mass and not necessarily about its geometrical axis. The rotating gyroscope, which is the spinning mass, under certain conditions will tend to precess, that is, its axis will move in a spiral path, departing more and more away from vertical. Upon departure of the basket axis from vertical, the rotating gyrator shaft, through the spherical friction members, exerts an accelerating force on the basket, tangential to the path precession of the basket, causing the basket to move toward vertical.

Thus, the basket and its contents is free to spin about its actual center of mass and the stabilizing devices maintain the basket in central upright position. The action of the centering springs, in balancing the dead weight of the basket and its contents, assist in the stabilizing action.

The centering springs operate to increase the lifting torque or restoring torque under all conditions of operation, that is to say, both while the spin shaft is accelerating for a centrifugal drying operation and after the spin shaft has acquired centrifugal drying speed; and the machine is also enabled to handle increased out-of-balance forces due to undistributed load or other causes. The centering springs increase the lifting force caused by the rotating gyrator shaft at all usuable gyrator shaft speeds; or, in other words, the centering springs cause the gyrator shaft to exert any given value of lifting torque at lower gyrator shaft speeds. The centering springs enable the machine to accelerate larger unbalanced loads up through the critical speed than it otherwise would.

The centering torque exerted by the centering spring assembly depends upon the design of the machine. This force should be so fixed as to obtain the proper pressure between the friction stabilizing members. Also, the unbalanced force due to the missing spring should be such as to easily permit the basket to fall over to its washing position, when filled with a normal charge of laundry and washing liquid as soon as the machine starts gyrating.

The slip clutch 40 not only protects the motor against overload, but acts to slow down the gyrator shaft at the beginning of a drying period when the motor is picking up the load caused by acceleration of the spin shaft. This reduction in gyrator shaft speed at this time acts to increase the lifting or restoring torque on the basket during this time. At the end of a rinsing or washing operation, wherein the spin shaft is held stationary and the gyrator shaft rotates, when the machine is shifting to the drying position, the gyrator shaft slows down almost to zero and then accelerates in a constant ratio with the spin shaft. I have found that greatly improved operation can be obtained by deliberately slowing down the gyrator shaft to a predetermined extent during the acceleration of the spin shaft. Thus, by providing the slip clutch on the motor shaft, a more nearly constant speed ratio between spin shaft and gyrator shaft is obtained, regardless of the speed of the motor. This slows down the gyrator shaft to a more efficient stabilizing speed while the spin shaft is accelerating.

The liquid balance rings cooperate with the gyrostabilizer to give an especially efficient correcting action during drying. The natural period of vibration of the gyrostabilizer is made so low that the machine accelerates to a spin speed above the critical speed before any substantial amount of water is expelled from the imperforate basket and before appreciable vibration of the basket relative to the tank due to unbalanced load commences. The friction plate 82 begins to slip on brake lining 87 at this time, thus permitting the basket and any unbalanced load to rotate about their common center of mass without transmitting such vibration to the machine frame or tank.

It is well known that a rotating body behaves differently below and above critical speed. Below critical speed, any unbalanced mass tends to move away from the center of rotation. Above critical speed, such unbalanced mass tends to move toward the center of rotation; that is to say, the rotating weight tends to rotate about its own center of mass.

For convenience we will refer to the side of the basket where the unbalanced load is located as the "heavy" side; the side of the basket diametrically opposite is then the "light" side.

At the end of the gyratory wash period the basket has substantially its full charge of washing solution or rinse water as the case may be, and the load of clothes or other fabric is substantially immersed. The specific gravity of fabric used in household clothes washers is almost the same as that of water. Hence, when the machine starts to spin, there is substantially no unbalance in the basket regardless of the position of the clothes. As the water begins streaming out of escape holes 115 and over the basket rim 127, unbalance is established to whatever extent the clothes are out of a uniform ring; as the water continues to leave the basket, this unbalance becomes greater, reaching maximum at the time the free water is all out of the basket. At this time the out-of-balance load contains the greatest amount of water; hence the unbalance is maximum at this instant.

Some time before the foregoing occurs, the machine has passed through its critical period and the basket is rotating about its center of mass; that is to say, with the unbalanced load and the geometric axis of the basket on opposite sides of the true axis of rotation. At this time the amplitude of vibration of the basket is at its maximum; that is, the distance between geometrical axis and true axis of rotation. This condition enables the water to run around the distributing duct 112, spill over its radial wall 132 and fill the inner ring 110 at a point diametrically opposite the point of unbalanced mass, that is, to fill the inner ring at the light side. As the inner ring 110 fills up on the light side, it spills over its radial wall 131 into the outer ring 111; and when the outer ring fills up on its light side, it overflows into the tank. The extracting of liquid from the fabric load in the basket continues. Hence the unbalance gets less, the longer the spin continues. The balance rings, however, retain their full charge of liquid on their "light" side to the end of the spin and the amplitude of vibration decreases.

The low critical speed of the present machine is obtained by the use of the universal mounting for the basket plus the fact that the restoring force of the centering springs acting radially is comparatively small. In this machine the critical speed may be as low as 80 to 90 R. P. M. with a top spin speed of about 600 R. P. M.

As in above mentioned copending application, Serial No. 554,327, the balance rings are deliberately limited in thickness (radial dimension); they are made as wide as possible (axial dimension) and a plurality of rings are used (rather than a single ring of equal liquid holding capacity). For example, two rings give a definite counter-balance effect with half the axial shift or vibration amplitude which would occur if one thicker ring were used.

Figure 14:
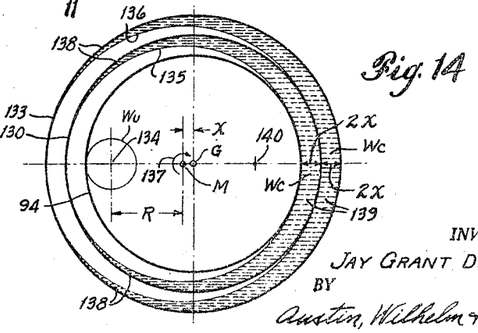
Fig. 14 is a diagram illustrating the corrective action of the open, liquid balance rings.

Reference is made to Fig. 14 for a better understanding of the operation of the open liquid balance rings.

Referring now to Fig. 14, the circular wall of the basket is denoted by 94 and its geometric axis or center of rotation, with balanced load, is denoted by G. The cylindrical walls of the two rings, denoted by 130 and 133, are concentric with G. The unbalanced mass (due for example, to uneven distribution of the clothes) is denoted by $Wu$ and is assumed to be concentrated at point 134 offset from the center of mass M by radius R.

The effect of the off-center unbalanced mass $Wu$ is to cause the true center of mass of the entire rotating body, including the basket and its contents, to shift from G to a point M through a distance X. The basket will then rotate, when driven at centrifugal discharging speed, about the center of mass M; and the liquid in the rings will take position with the inner surfaces of the liquid concentric with M as indicated by 135, 136.

For most efficient balancing action according to the invention, the ring thickness is made 2X where X is the maximum allowable amplitude of vibration for which the machine is designed. Maximum vibration will occur when the machine is unevenly loaded with the maximum out-of-balance load for which the machine is designed. The value X is most conveniently measured, in actual practice, by measuring the diameter of the circle of geometrical center G describes about the center of mass M; this diameter is referred to as the "double amplitude of vibration" which is 2X. This rotation of G about M is denoted by the arrow 137. As spinning continues, the center M moves closer and closer to G because the unbalanced load gets less and less through loss of water.

It will be understood that the point 134 at which the unbalanced mass is considered to be concentrated and the radii R and X are assumed to be in a plane perpendicular to the true axis of rotation somewhere between top and bottom of the basket. When measured at the top of the basket, the amplitude of vibration X may be somewhat larger than at the plane in which the center of unbalanced mass is located.

When the basket rotates about its true geometrical axis G, assuming the load and rotating parts to be symmetrical about this axis, the liquid will be evenly distributed within the rings.

If, however, the rotating mass, which includes the basket and its contents, is unbalanced, which will be the usual condition in use, the basket will rotate about some point other than G, which is called the center of mass M as described above. Since the liquid tends to take a position furthest away from the center of rotation, the liquid will flow to a point remote from the unbalanced mass Wu, as indicated in Fig. 14, tending to correct the unbalanced condition and to bring the resultant center of mass M closer to the geometrical axis G than if the balancing rings were not used.

The most efficient correcting action takes place with the greatest relative shift of liquid. This condition obtains when the surfaces 135, 136 of the liquid on one side of the basket, are ready to overflow the upper and lower walls of the rings and, at the other side of the basket, the rings are about empty. This condition is indicated in Fig. 14; the liquid takes a crescent shape with its horns 138 on the opposite side of the center of mass M from the main body 139 of the liquid. The center of mass of the liquid crescents Wc will be at some point 140 diametrically opposite 134.

The most effective distribution of liquid for any condition of unbalance will be obtained, with the ring about half filled with liquid, and when the double amplitude of vibration (2X) is equal to the radial thickness of a ring. As will be seen from the drawing, the inner surface (135 and 136) of the liquid, ignoring gravity, always takes a shape concentric about the actual center of rotation M (center of mass).

Distinction between disturbance to the machine frame due to basket vibration and mere wobbling of the basket due to vibration should be borne in mind. The use of the gyrostabilizer (without rings) and its permitting the basket and contents to spin about its own center of mass, eliminates jumping about of the machine on the floor and consequent danger, disturbance and noise; the machine runs perfectly quiet. But due to lack of coincidence of geometric center and center of mass, the basket will wobble i. e., the center of the top of the basket hub will describe a circle on a sheet mounted on the tank. This is referred to as the double amplitude of vibration. The balancing action of the balance rings, by shifting the corrective mass of liquid to the side of the basket opposite the out-of-balance load, brings the resultant center of mass of the entire spinning assembly nearer to the geometric center of rotation. This not only reduces the wobbling appearance of the basket but reduces the correcting job which the gyrostabilizer performs.

As an example of actual dimensions, the machine, according to the invention, may have the following approximate principal dimensions. The basket may be about twelve inches high and about twenty inches in diameter. The capacity for washing may be eight gallons of water and seven or eight pounds of dry clothes. The inner balance ring may be about eight inches high (axially) and about three-eighths to one-half inch thick (radially). The outer balance ring may be of the same thickness but of a correspondingly less height. The distance between the universal joint and the center of mass of the basket may be about fifteen inches; the maximum spin speed may be about 600 R. P. M. and the gyrator speed may be about 120 R. P. M. The restoring force exerted by the diagonal springs (with friction surfaces disengaged) may be about fifteen to eighteen pounds with the empty basket pulled all the way over. The pressure of the plate 82 on the friction ring 87 may be thirty to thirty-five pounds. The critical speed of vibration may be 80 or 90 R. P. M. Such a machine under test has carried an out-of-balance load of as much as eight pounds with as small as two-thirds inch double amplitude of vibration measured at the top of the basket hub.

The machine may be made of structural materials commonly used for washing machines. In case of metal, free use has been made of welding to hold parts fixedly together. Certain parts, such as the basket and the liquid balancing rings may be made from suitable non-metallic materials, such as fibre glass reinforced plastic. Such parts may be cemented or connected together by rivets according to accepted practice.

While certain novel features of the invention have been disclosed herein, and are pointed out in the annexed claims, it will be understood that various omissions, substitutions and changes may be made by those skilled in the art without departing from the spirit of the invention.

What is claimed is:

1. In a centrifugal machine, a basket, a plurality of nested annular, open ducts on said basket, means for spinning said basket for centrifugal extraction, the arrangement being such that liquid centrifugally discharged from said basket is caught by an inner duct and liquid centrifugally discharged from said inner duct is caught by the next outer duct.

2. In a centrifugal machine, an open top basket having an annular side wall, said basket being sufficiently imperforate to hold laundry and laundry liquid when stationary, a spin shaft secured to the underside of said basket, means for driving said spin shaft to spin said basket, a yieldable mounting for said spin shaft, said mounting imparting to the rotatable assembly a low critical speed materially below the normal spin speed, a duct surrounding the side wall of said basket and forming part of the rotatable assembly, said basket having discharge means for centrifugally discharging liquid into said duct, said duct permitting the liquid to shift circumferentially of the duct, baffling means to retard, but not prevent, shifting of said balancing liquid in said duct.

3. In a centrifugal machine, a spinning assembly including an open top basket and a balancing duct secured thereto, said basket being sufficiently imperforate to hold both laundry and liquid, said basket being adapted to contain an unbalanced load, yieldable means under said basket to support said assembly in such manner as to enable it to spin about the center of mass of the spinning assembly and its contents, said basket having an annular wall with a discharge portion, said duct being secured to said annular wall and extending axially along the greater part of the material-holding part of the basket, said duct having an open portion disposed in such position as to receive liquid centrifugally thrown from said discharge portion, baffle means in said duct to prevent surging of said liquid, said assembly having distributing means extending circumferentially to receive basket liquid at any circumferential location thereof and to bypass the baffle means to supply said duct at a location directly opposite the unbalanced load.

4. In a washing machine, a basket sufficiently imperforate to hold both laundry and laundry liquid for washing, said basket having an open top for insertion of laundry, a spin shaft connected to the underside of the basket, yieldable means for supporting said basket from below the basket, means for agitating the laundry liquid in the basket for washing, means for spinning the basket for drying, both said agitate means and said spin means being applied to said basket from below the basket, said basket having an upstanding side wall, said side wall having a liquid discharge portion, said discharge portion having selective means to impede spillage of the liquid during washing and to permit discharge of the liquid during drying, a balance duct on the outer face of said side wall having a liquid-containing wall providing a circumferentially extending channel open on the side facing the axis of rotation, said duct having a series of pockets in position to receive liquid discharged from said discharge portion during drying.

5. In a centrifuge, a spin assembly comprising a basket and a balancing duct, means to spin said basket about its geometric axis, said balancing duct being annular and surrounding the side wall of the basket and rotatable with the basket, means for arranging the spin assembly so as to allow the center of the balancing duct to take a position eccentric to the actual axis of rotation of the basket, said basket side wall having a discharge portion from which liquid is centrifugally discharged, said duct having an outer wall with inwardly extending wall portions, to provide an annular passage to receive basket liquid centrifugally discharged from said discharge portion and to convey said liquid circumferentially of said duct, and retarding means associated with said duct, said retarding means acting to retard, but not to prevent, the circumferential flow of balancing liquid contained in said duct, said retarding means and said discharge portion being so related that liquid in the basket may flow directly from said basket to any circumferential part of the duct without substantial impedance by said retarding means.

6. In a centrifugal machine, a spinning assembly including a basket and an annular balancing duct, means for spinning said assembly about its geometric axis, said basket being adapted to contain liquid and an unbalanced solid load, said basket, duct, liquid and load forming part of a spinning mass, yieldable means to support said spinning mass in such manner as to enable it to spin about an actual axis of rotation spaced from said geometric axis, said basket having an annular wall with a discharge portion, said duct comprising a series of pockets secured to said annular wall, said duct extending circumferentially completely around the basket, said duct receiving basket liquid centrifugally discharged from said discharge portion, portions of said duct between said pockets being restricted to retard, but not to prevent, circumferential flow of liquid from pocket to pocket, whereby the liquid in said pockets is disposed eccentrically with respect to said geometric axis.

JAY GRANT DE REMER.

References Cited in the file of this patent

UNITED STATES PATENTS

| Number | Name | Date |
|---|---|---|
| 1,521,858 | Bock | Jan. 6, 1925 |
| 1,604,748 | Grauer | Oct. 26, 1926 |
| 1,743,441 | Dunham | Jan. 14, 1930 |
| 1,757,585 | Orr | May 6, 1930 |
| 2,171,845 | Cureton | Sept. 5, 1939 |
| 2,287,238 | Bonsiakos | June 23, 1942 |
| 2,372,769 | De Remer | Apr. 3, 1945 |
| 2,414,645 | Hays | Jan. 21, 1947 |
| 2,463,801 | Page | Mar. 8, 1949 |
| 2,471,217 | Johnson | May 24, 1949 |
| 2,513,844 | Castner | July 4, 1950 |
| 2,525,781 | De Remer | Oct. 17, 1950 |
| 2,534,194 | Emmert | Dec. 12, 1950 |
| 2,549,756 | Clark | Apr. 24, 1951 |